Figure 1:
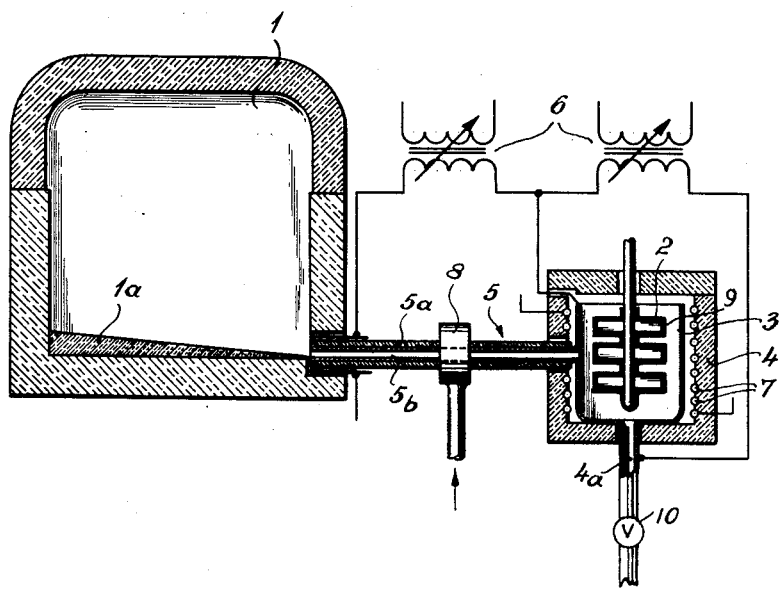

Feb. 23, 1960 C. EDEN 2,926,208
METHOD AND APPARATUS FOR MELTING GLASS
Filed Feb. 5, 1957

INVENTOR
CARSTEN EDEN

By Burgess, Dinklage + Sprung

ATTORNEYS

United States Patent Office 2,926,208
Patented Feb. 23, 1960

2,926,208

METHOD AND APPARATUS FOR MELTING GLASS

Carsten Eden, Mainz, Germany, assignor to Jenaer Glaswerk Schott & Gen., Mainz, Germany Application February 5, 1957, Serial No. 638,328

Claims priority, application Germany February 7, 1956

13 Claims. (Cl. 13—6)

The present invention relates to a new and improved method and apparatus for melting glass, wherein the basic mixture is melted down and refined in a tank furnace, and the molten glass is homogenized in a separate homogenizing vessel.

In manufacturing high-grade glass, particularly for optical purposes, it is an absolute requirement that the cords contained in the glass be removed. Such glass which is generally only needed in relatively small quantities is usually not melted in large tank furnaces but in individual pot furnaces from which, after the mixture has been melted down and refined to some extent, the cords are removed through tubes.

However, it has been found that especially for a large-scale production it is more economical and of greater advantage to use tank furnaces, and particularly so-called daily tanks for small charges, rather than pot furnaces. However, it is impossible to melt high-grade glass in such daily tanks since these large containers do not permit the molten glass to be stirred and the cords thus to be removed therefrom.

It has already been proposed to refine molten glass by stirring it in a cylindrical vessel separate from the supply furnace, and to pass the glass from an overflow of the furnace to the cylindrical vessel through a trough-like channel or a pipe. This known process did not, however, prove successful since the molten glass was fed from the melting furnace to the connecting pipe or channel leading to the refining vessel by passing over the overflow of the furnace so that the latter could never be emptied completely during each operation.

It is the object of the present invention to provide a new method which avoids all the disadvantages of the previously known methods and also affords additional advantages not attainable by these methods.

For melting down the basic mixture and for refining the molten glass, the method according to the present invention also utilizes a tank furnace, while for homogenizing the molten glass it also utilizes a separate homogenizing vessel which communicates with the tank furnace by a connecting pipe. However, contrary to that used in the known methods and apparatus, this connecting pipe preferably consists of a platinum tube which is enclosed by a jacket of ceramic material. It is thus possible to heat the glass within and passing through this connecting pipe directly by means of the platinum tube therein which is connected to the adjustable heating current.

An advantage gained by the present invention is the fact that the viscosity of the molten mass may be controlled practically without inertia and therefore very precisely, and that the homogenizing vessel may thus be filled to whatever extent may be desired. Another advantage of considerable importance resides in the fact that the tank furnace may now be emptied completely, regardless of whether it is used in a continuous or discontinuous operation, and that it will thus always be available for receiving a glass mixture of a different composition.

Since the homogenizing operation only requires a vessel of small volume, this vessel may also be made of platinum or be lined with platinum. This homogenizing vessel is also preferably heated directly by conducting the current through the platinum walls thereof.

Further objects, features, and advantages of the present invention will be apparent from the following detailed description thereof, particularly when read with reference to the accompanying diagrammatical drawings of one preferred embodiment thereof, in which—

Figure 2:
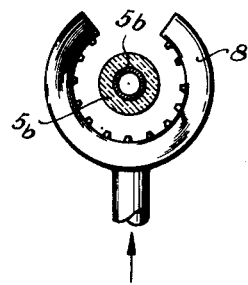

Fig. 1 shows a cross-sectional over-all view of the entire apparatus according to the invention; while Fig. 2 shows a specific manner of cooling the connecting pipe.

Referring to the drawings, the glass ingredients are melted down and refined in a so-called daily tank furnace 1, while the molten glass is homogenized in the homogenizing vessel 4 which is lined with a layer 3 of platinum and provided with a stirring mechanism 2. The tank furnace 1 and the homogenizing vessel 4, which has a closable drain opening 4a in the bottom thereof provided with means 10 for opening and closing the same, are connected with each other by a pipe 5 which consists of a platinum tube 5b enclosed by a jacket 5a of ceramic material. Both the homogenizing vessel 4 and pipe 5 may be heated directly by conducting the current supplied by the adjustable transformers 6 through the platinum metal.

Apart from thus heating the homogenizing vessel 4 directly, it is also advisable to provide an additional indirect heating system by means of heating coils 7.

According to the present invention, connecting pipe 5 is attached to tank furnace 1 at the bottom thereof so that the tank can be emptied completely during the operation. For this purpose it is also advisable to incline the bottom 1a of tank 1 toward its outlet containing the connecting pipe 5.

A particular advantage attained by the invention consists in the fact that the supply of molten glass to the homogenizing vessel 4 may be controlled with utmost precision by permitting the glass within pipe 5 to be heated directly and without any losses due to inertia, and such heat to be accurately regulated by a suitable adjustment of the heating current. In this connection, it is particularly advisable also to extend the direct heating action to the leadin from pipe 5 through the ceramic wall of tank furnace 1 and the wall of vessel 4 so that the bothersome "thawing" of the glass at the beginning of the operation will be greatly facilitated.

For controlling the temperature of connecting pipe 5, the same may also be provided with an annular cooling pipe 8, as shown in a side view in Fig. 2, which is supplied with a cooling air current from a blower, not shown. By turning on such blower, it is possible to reduce or cut off the supply of molten glass to the homogenizing vessel 4 very quickly. In this connection it also constitutes an important feature of the invention that the supply of molten material to the homogenizing vessel 4 may be controlled at any time entirely independently of the amount of glass contained in tank furnace 1.

As usual, the stirring mechanism 2, or at least the parts thereof which come in contact with the molten glass, are preferably coated with a platinum coating 9.

The present invention thus provides a method and apparatus which affords all the advantages of melting glass in pot furnaces, tank furnaces, or platinum crucibles without, however, having any of the disadvantages of these methods. Particularly for producing optical glass, this new method is of great advantage, and the entire melting process may be carried out much more economically than according to any of the previous methods.

Even though my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of melting glass comprising the steps of melting down the glass ingredients and refining the molten mixture in a tank furnace, conducting the molten glass from the bottom of said tank furnace to a separate homogenizing vessel through a platinum tube enclosed by a jacket of ceramic material connected to said furnace at the bottom thereof, and directly regulating the temperature and consistency of the glass in said tube by passing an adjustable electric current through said tube.

2. A method as defined in claim 1, further comprising the step of cooling the jacketed platinum tube whenever required to increase the viscosity of the molten glass within said tube and thereby shut off the supply of glass from the tank furnace to the homogenizing vessel.

3. A method as defined in claim 1, further comprising the step of directly regulating the temperature on the inside of said homogenizing vessel by passing an adjustable electric current through a platinum lining along the inner walls of said vessel.

4. A method as defined in claim 1, further comprising the steps of directly regulating the temperature on the inside of said homogenizing vessel by passing an adjustable electric current through a platinum lining along the inner walls of said vessel, and by also heating said vessel indirectly.

5. An apparatus for melting glass comprising a tank furnace for melting down the glass ingredients and refining the molten glass, a platinum tube connecting said furnace with a separate homogenizing vessel, said tube being connected to said furnace at the bottom thereof, a jacket of ceramic material enclosing said tube, electric means for heating said tube directly by passing an electric current therethrough, and means for regulating the intensity of said current.

6. An apparatus as defined in claim 5, further comprising means for cooling said tube for increasing the viscosity of the molten glass within said tube.

7. An apparatus as defined in claim 5 further comprising an annular member at least partly surrounding said jacket, and means for passing a cooling air current into said member for cooling said jacket and the platinum tube therein.

8. An apparatus as defined in claim 5, further comprising a platinum lining along the inner walls of said homogenizing vessel, electric means for heating said lining by passing an electric current therethrough, and means for adjusting the strength of said current.

9. An apparatus as defined in claim 8, further comprising means for also heating said vessel indirectly.

10. An apparatus as defined in claim 5, wherein at least said platinum tube also extends through the leadins in the walls of said furnace and said vessel for heating said leadins.

11. An apparatus as defined in claim 5, wherein said homogenizing vessel has a drain opening in the bottom thereof, means for opening and closing said opening, and a stirrer within said vessel.

12. An apparatus as defined in claim 11, wherein the outer surfaces of the portions of said stirrer within said vessel which are adapted to come into contact with the molten glass consist of platinum.

13. An apparatus as defined in claim 5, wherein the volume of said homogenizing vessel is relatively small as compared with the volume of said furnace.

References Cited in the file of this patent

UNITED STATES PATENTS

| | | |
|---|---|---|
| 1,458,522 | Clark | June 12, 1923 |
| 1,593,054 | Arbeit | July 20, 1926 |
| 2,041,486 | Richalet | May 19, 1936 |
| 2,186,718 | Ferguson | Jan. 9, 1940 |
| 2,212,528 | Slayter | Aug. 27, 1940 |
| 2,707,717 | Seymour | May 3, 1955 |

FOREIGN PATENTS

| | | |
|---|---|---|
| 1,018,506 | France | Oct. 15, 1952 |